Aug. 18, 1936.  E. L. HOFFMAN  2,051,044
PARACHUTE APPARATUS
Filed March 10, 1932  7 Sheets-Sheet 2

INVENTOR
Edward L. Hoffman
BY
ATTORNEYS.

INVENTOR
Edward L. Hoffman.
BY
ATTORNEYS.

Aug. 18, 1936.  E. L. HOFFMAN  2,051,044
PARACHUTE APPARATUS
Filed March 10, 1932  7 Sheets-Sheet 5

INVENTOR
Edward L. Hoffman.
BY
ATTORNEYS.

Aug. 18, 1936.   E. L. HOFFMAN   2,051,044
PARACHUTE APPARATUS
Filed March 10, 1932   7 Sheets-Sheet 6

INVENTOR
Edward L. Hoffman
BY
ATTORNEYS.

Aug. 18, 1936.   E. L. HOFFMAN   2,051,044
PARACHUTE APPARATUS
Filed March 10, 1932    7 Sheets-Sheet 7

INVENTOR
Edward L. Hoffman
BY
ATTORNEYS.

Patented Aug. 18, 1936

2,051,044

UNITED STATES PATENT OFFICE 2,051,044

PARACHUTE APPARATUS

Edward L. Hoffman, Dayton, Ohio

Application March 10, 1932, Serial No. 597,985

9 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to parachute apparatus and more particularly to improved means for carrying and operating the same. The invention has particular reference to that type of parachute harness and pack which is used by observers or gunners in aircraft wherein it is desired to have the parachute pack normally detached from the harness so as to permit the aviator to move readily in and about the cockpit and yet so arranged as to be quickly attachable to the parachute harness when needed.

Heretofore considerable inconvenience has been experienced by aviators having to continually wear a parachute on the body, the crowded conditions of the cockpit in the average type of airplane, especially those designed along military lines, making it practically impossible to move around to any great extent. In the case of observers or gunners in the rear cockpit of a military airplane, wherein it is necessary for the person to stand up or partially crouch in the cockpit, the wearing of a parachute and pack constantly strapped to the person's body has been found to be very cumbersome especially for quick maneuvering, and for this reason in many instances parachutes have been discarded entirely in order to permit greater freedom of movement.

The main object, therefore, of the present invention is to provide a parachute pack and harness construction wherein comfort to the aviator under normal flying conditions is the main consideration.

A further object of the present invention is to provide a parachute pack adapted to be worn upon the chest of the aviator so constructed and arranged that it may be carried either constantly or only in cases of emergency, as the case may be, and to be controllable manually by the aviator so that a quick opening of the pack and release of the parachute may be accomplished when necessary and with a minimum of time.

A further object of the present invention is to provide a separable coupling device comprising male and female members carried by the harness and pack respectively arranged to be readily and quickly relatively engageable when occasion demands and yet not readily disengageable without the use of any instruments or other operative means to effect such disengagement. In providing a coupling device of this character the aviator is assured of the pack being securely attached to the harness during his descent.

A further advantage of the use of such pack coupling device lies in the fact that the aviator may either attach the pack to the harness by manually clasping the pack to the chest or the coupling may be so constructed that connection may be made merely by the aviator leaning against the pack and snapping the harness connection to the pack connection, the hands being entirely free during this operation.

The present invention is further characterized by the provision of a novel harness which permits the pack to be carried on the chest of the aviator. A harness constructed in the manner of the present invention provides suitable means for attaching the male coupling member of the pack attaching device to the breast straps of the body harness, the female coupling member being attached directly to the body portion of the pack or vice versa. The suspension lines of the parachute are arranged to be attached to one coupling member by means of a D-ring, which is mounted on the parachute pack, thus eliminating the use of conventional riser straps of the parachute harness which ordinarily project from the corners of the packs. This method of suspension presents among other advantages the added advantage of eliminating practically all of the metal connectors heretofore found necessary in connecting the suspension lines to the harness; consequently the danger of the aviator being struck by these metallic parts when the parachute is released is overcome.

A further object of the present invention is to produce a pack especially adapted for use with the coupling device hereinbefore mentioned, one which is easier and quicker in opening than packs heretofore constructed and a feature of this part of the invention is to provide a more dependable releasing mechanism for releasing the parachute under all service conditions than has been heretofore obtained and in providing additional means for relatively retaining the suspension lines in the pack and in delaying their release from the parachute pack until the parachute has been withdrawn and fully extended above the aviator. By delaying the release of the suspension lines, the hazard of their becoming entangled in the parachute or about the body of the aviator is substantially entirely eliminated.

A still further object of the present invention is to provide a plurality of suspension line regulators comprising bands of resilient material secured to the body portion of the pack in a manner such that the release of the suspension lines is always positive regardless of the angle of pull imparted to the suspension lines in leaving the pack.

The invention further contemplates the provision of an adapter for holding the pack in the cockpit when not worn by the aviator. A further object of the invention being in providing a novel spring actuated rip cord handle adapted to cooperate with the rear portion of pack adapter in such fashion that when the pack is mounted in the adapter, the rip cord handle will lie flush. In providing a rip cord handle of this character, accidental release of the parachute while contained in the pack adapter is substantially entirely eliminated.

My invention also consists in certain other features of construction and in the combination and arrangement of the several parts to be hereinafter fully, clearly and concisely described and defined in the appended claims and illustrated in the accompanying drawings, wherein:

Figure 7:
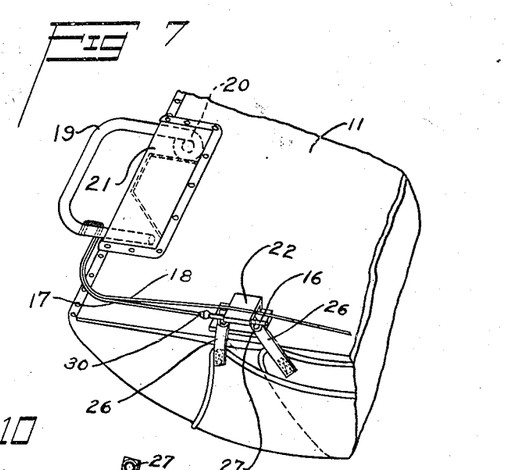
Fig. 7 is a partial detailed view of one corner of the parachute pack, showing the position of the releasable flap fastening means of the pack and the method of attachment of the rip cord thereto.

Referring more particularly to the drawings, wherein corresponding parts are designated by like numerals throughout the various views thereof, 10 indicates a pack embodying a container preferably made of some flexible material, as for instance a waterproof fabric. This container comprises a body portion 11 having end or side flaps 12 and a center flap 13, the said container having a general outline shown in Fig. 10. These flaps are folded over to form a closure for the contained main parachute 14 and pilot parachute 15 in a manner which will be readily understood by observing the drawings without further detailed description. The body portion or base plate 11 of the pack is preferably made of plywood and the flaps 12 and 13 are tacked or otherwise secured to the outer edges of the said base portion, as shown in Fig. 7. Any suitable means easily releasable may be utilized for holding the flaps in their folded position, but in the form of the invention herein illustrated, and in order to insure a quick opening of the pack, the present invention contemplates the use of a plurality of pins 16 carried by individual pull cords or cables 17 and 18, which are in turn separately attached to the rip cord handle 19, as will be noted by referring to Fig. 7. This rip cord handle comprises a bent tube substantially U-shaped in character and having its one free end curled as shown at 20, to prevent the handle from slipping from the hand when in operation. This three-sided structure fits together within a pocket 21 secured to the base portion 11 of the pack, the closed end protruding sufficiently for to permit the handle to be readily released when desired. By making the base portion 11 of the pack rigid, as heretofore mentioned, the impact load imparted to the wearer's body when the shroud lines of the parachute are drawn taut is distributed over a considerable frontal area of the wearer's body by reason of the fact that the base portion when worn forms a baffle plate of relatively large plate area covering a substantial portion of the wearer's chest.

Figure 8:
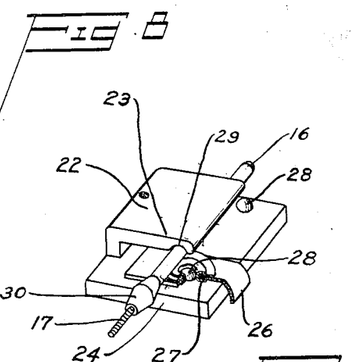
Fig. 8 is a view in perspective of my flap fastener per se, with rip cord pin.
Figures 9, 10, 11:
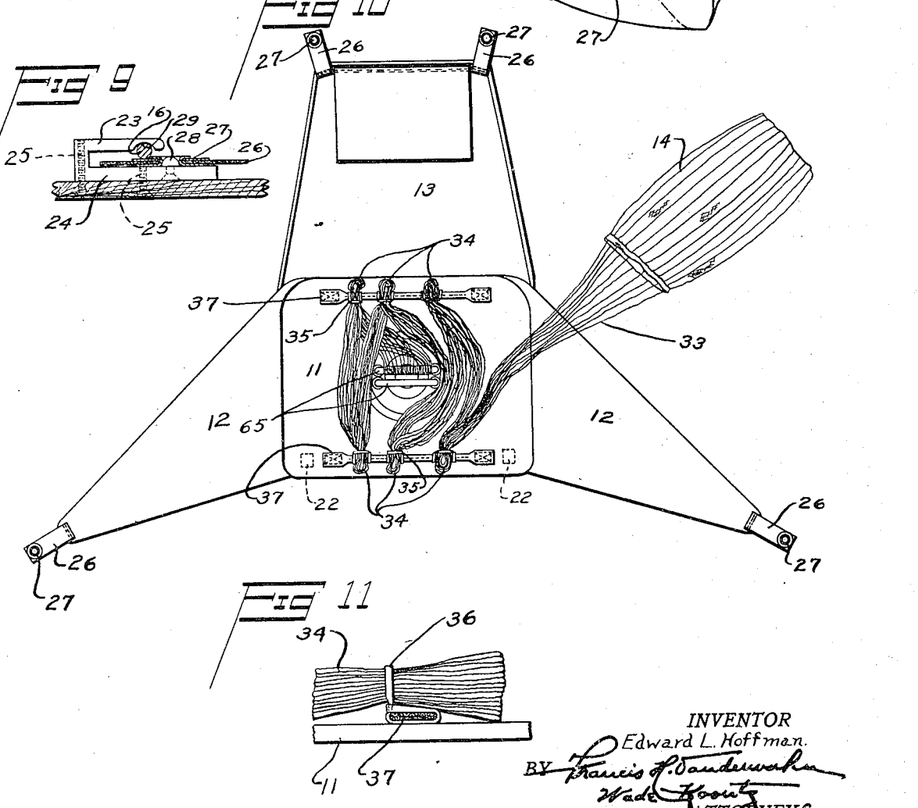
Fig. 9 is an end view of the flap fastening means showing the position of the tab end of the flaps when engaged by rip cord pins.
Fig. 10 is a view of the pack in a released condition showing the suspension line delayers and method of looping the suspension lines thereon.
Fig. 11 is a detail view of the suspension line delayers that may be used with the parachute pack showing the manner of attaching same to the pack body portion.

The parachute pack herein illustrative of the invention is of a type adapted to be worn upon the chest of the aviator. Packs of this general character have been found from past experience to be unusually awkward, especially for gunners or observers in military airplanes wherein the nature of their work requires them to be constantly moving around in the cockpit and for this reason it is intended that the pack shall be normally detached from the body of the wearer and located in some suitable place where it will be instantly available should occasion arise requiring its use. For this reason it is necessary for the rip cord and rip cord handle to be conveniently mounted for instant operation on the pack itself instead of being attached to the harness of the wearer, as has been the practice in the past. With this end in view, suitable releasable fastening means for securing the ends of the flaps to the body portion of the pack may be provided so that very little effort is required to operate the release cord and effect the release of the parachutes contained therein as quickly as possible. In accordance with the present illustrative case, I prefer to use the construction shown in detail in Figs. 7, 8 and 9, embodying a U-shaped flap fastening device 22, one for each side of the base portion of the pack which are mounted at the one end of the said base portion, as shown in Fig. 7. Each flap fastening device is formed with an upper and a lower wall 23 and 24 respectively, the lower wall being secured to the base portion of the pack by means of screws 25, as shown in Fig. 9. The end flaps 12 and the center flaps 13 have attached thereto fastening tabs 26, into each end of which is fitted a small grommet 27, which, when the pack is closed, are adapted to fit over half round rivet heads 28 fixedly secured to the lower wall 24 of the flap fastening where they are securely held in place when the rip cord locking pins 16 are inserted in the groove 29 provided in the upper wall 23 of each fastening device 22. From the foregoing description of the flap fastening device it will be apparent that the strain exerted by the flaps when in the packed condition is carried by the rivet heads 28 instead of by the release pin 16 and as a result the removal of the rip cord pins may be effected with little effort. Each pin is conveniently provided with a bulged portion 30 which is to limit the travel of the pin in one direction. Each fastening device is provided with a plurality of rivet heads mounted in spaced relation so that each flap can be secured to a fastener irrespective of and separate from the other flap and when thus positioned on a fastening device the tab ends are side by side instead of being overlapped as has been the practice in the past. When in a locked position, the rip cord is adapted to bear against the surface of the groove in the upper wall and the surface of the grommets respectively whereby to hold the flap in releasable locked position.

Figures 3, 23:
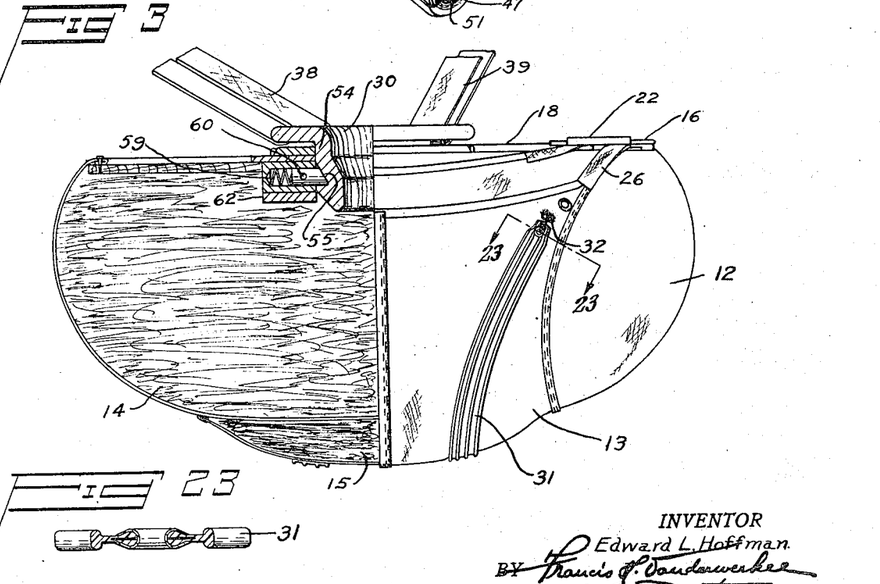
Fig. 3 is a part sectional view of the parachute pack illustrating the male and female coupling members when in an engaged position.
Fig. 23 is a cross-section taken on the line 23—23 of Fig. 3.

In order to effect a quick and free opening of the pack so as to freely release the parachutes contained therein, flat bands of rubber 31, or other elastic material, are provided, the ends 32 of these bands being attached, as shown in Fig. 3, at points adjacent the releasable ends of each flap, the other ends of the bands being secured to the body portion of the pack in a manner well known in the art. As shown in Fig. 23, the bands 31 are reinforced at the ends with inserts of fabric material to prevent the ends from tearing loose when under strain. When the pack is folded these elastic bands are placed under tension, consequently when the edges of the flaps are released by pulling upon the rip cords 17 and 18, these elastic bands tend instantly to pull the edges of the flaps apart and to throw the pack open to the position indicated in Fig. 10, thus releasing the contained parachutes.

The suspension lines 33 of the main parachute aforementioned are laid back and forth on the body portion of the pack, as shown in Fig. 10, with their looped ends 34 tucked in regulators or suspension line delayers 35 comprising bands 36 of rubber or other elastic material, which are threaded around retaining tapes 37, the latter being sewed on either side of the body portion of the pack, said rubbers holding the suspension lines until forcibly withdrawn therefrom by the drag of the pilot chute and the main parachute.

Figure 1:
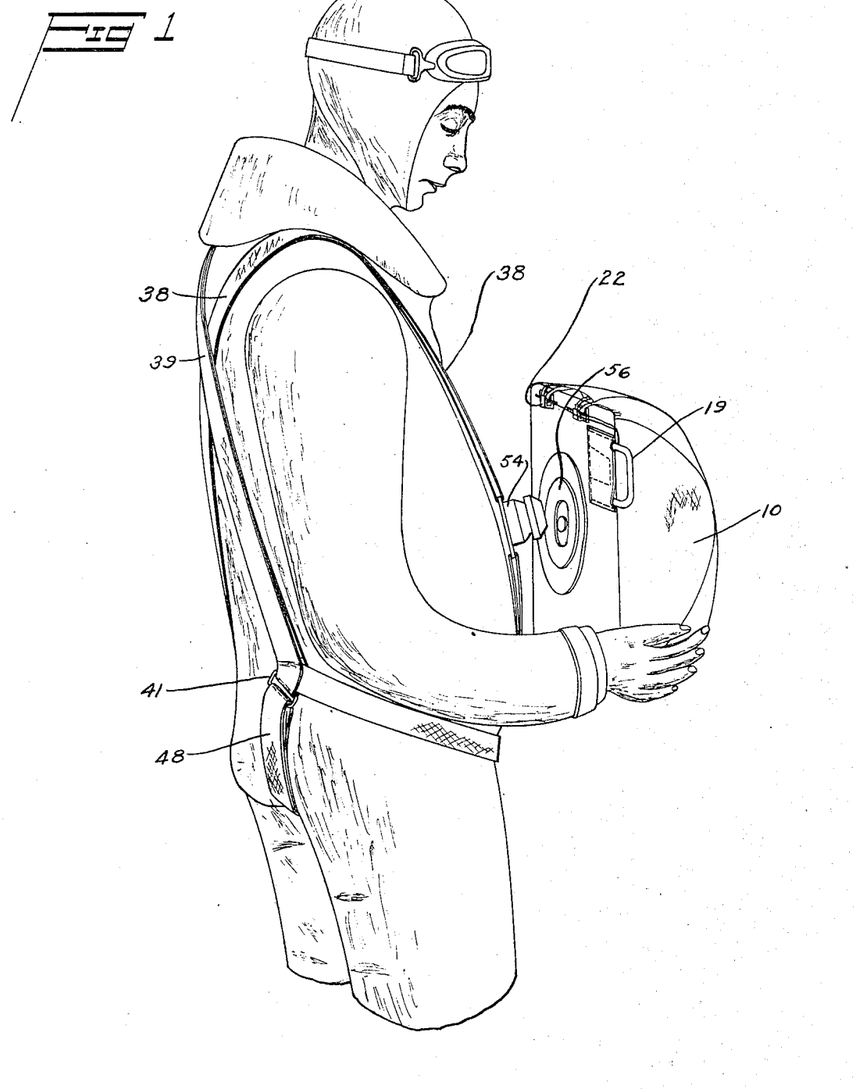
Fig. 1 is a side view in perspective of an aviator equipped with my improved form of parachute apparatus pack, showing the pack detached from the harness.
Figure 2:
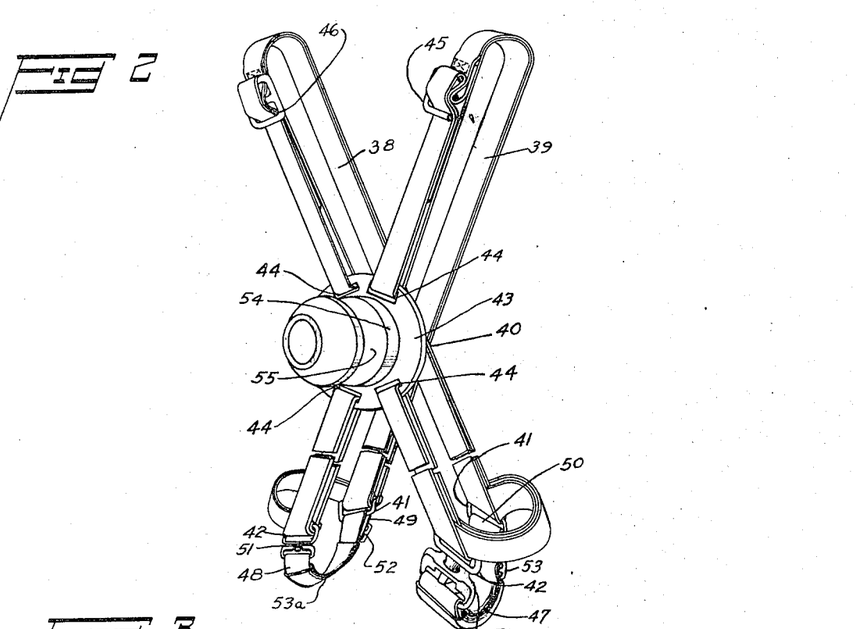
Fig. 2 is a view in perspective of the harness per se with male coupling member attached thereto.
Figure 5:
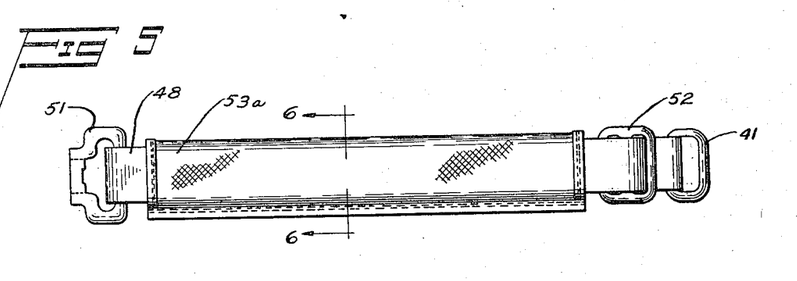
Fig. 5 is a general view of the construction of the leg straps of the harness, including the use of tubular members thereon for holding the leg straps in correct position.
Figure 6:
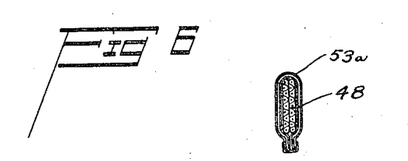
Fig. 6 is a sectional view taken on the line 6—6 of Fig. 5.

The pack herein shown is adapted to be normally detached from the aviator and may be carried in the aircraft in any suitable manner convenient which permits the same to be readily manually grasped by the aviator when needed. To this end the aviator is provided with a body harness comprising main body supporting straps 38 and 39 shown in Fig. 2, which are arranged to pass over the shoulders of the aviator and thence diagonally downward, crossing the back of the wearer, as shown at 40, to the opposite side of the body and continuing downward to the side of the aviator adjacent the hips, where they are threaded through the link fittings 41 and thence around to the front of the body. At this point the straps are threaded through male fastening member 42 of a harness fastener device. The straps continue diagonally upward from this point to the chest of the aviator where they are adapted to be attached to a male coupling member 43, having slots 44 provided thereon to receive the ends of the straps aforementioned, the harness generally assuming the aspect of a cross, as will be apparent by observing Fig. 2 with the male coupling member 43 positioned substantially central with respect to the wearer's chest. The body straps after passing through the male coupling members are returned across the back and over the shoulders of the aviator in the reverse manner described. Generally, each body strap consists of but one piece of webbing which doubled upon itself in the manner heretofore described permits of the use of but one adjusting fitting for each body strap, as shown at 45 and 46, by means of which the supporting straps are readily adjustable to stature of the wearer. Leg straps 47 and 48 attaching at their one ends 49 and 50 to the link fittings 41 are provided, which extend around the inside of the legs, their free ends being provided with female fastening members, as at 51, for attachment to the male fasteners 42 heretofore mentioned. Each leg strap aforesaid consists of a single piece of webbing doubled over and provided with adjusting fittings 52 and 53 to adjust for proper lengths. To retain the leg straps in proper position retaining tubes 53a of fabric material are provided, as shown in Fig. 5, which are slidably mounted on the leg straps. By mounting the male coupling member 43 at the ends of the chest straps in the manner hereinabove described, the load through the coupling members is distributed more or less evenly through the leg, back and chest straps of the harness and thereby dampens to a material extent the shock to which the body of the wearer is subjected at the instant of inflation of the parachute.

The male coupling member 43, heretofore mentioned, is provided with a cylindrical projection 54 constituting a locking head and provided with a peripheral groove 55, as shown in cross-section in Fig. 3.

Figure 4:
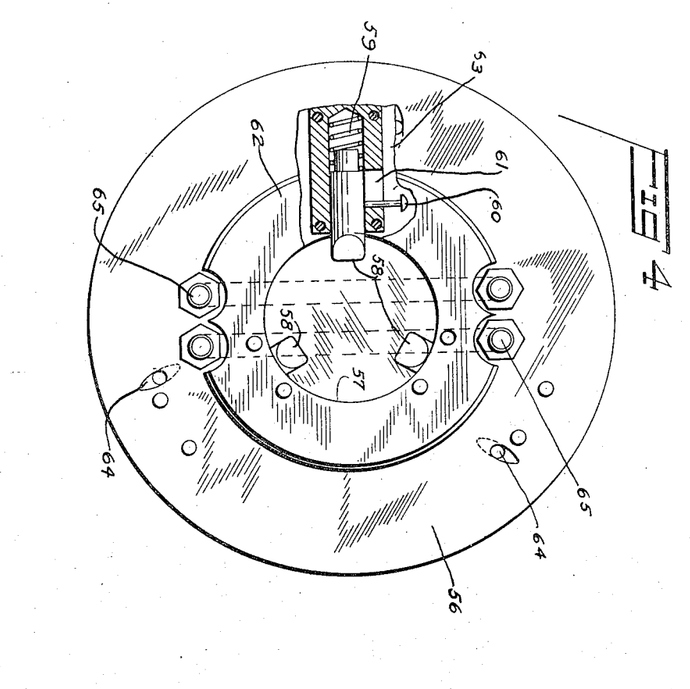
Fig. 4 is a top plan view of the female coupling member of the pack coupling device.

A female coupling member 56 is also provided, which is mounted on the plywood base portion 11 of the pack, said female coupling member being formed with a cylindrical opening 57 to receive the locking head 54 therein. The female coupling member is also provided with a plurality of radially extending locking latches 58 adapted to engage in the groove 55 of the male coupling member when said male and female coupling members are in assembled position. Each locking latch is suitably provided with a coil spring 59, as shown in Fig. 3, adapted for normally urging each locking latch into locking engagement with the groove 55. Each locking latch is also provided with a pin 60 extending laterally therefrom, as will be noted by referring to Fig. 4, which rides in a slot 61 formed in an extension of the body portion 62 of the female coupling member. These pins are so arranged as to lie in a hollowed out portion 63 of the coupling member and accessible only by inserting suitable wire hooks (not shown) through slot 64 when it is desired to separate the male and female coupling members. The female coupling member is also provided with a pair of U-shaped anchoring members 65 fixedly attached to the inner face of the female coupling member to which the suspension lines of the main parachute are secured, as noted in Fig. 10.

Figure 12:
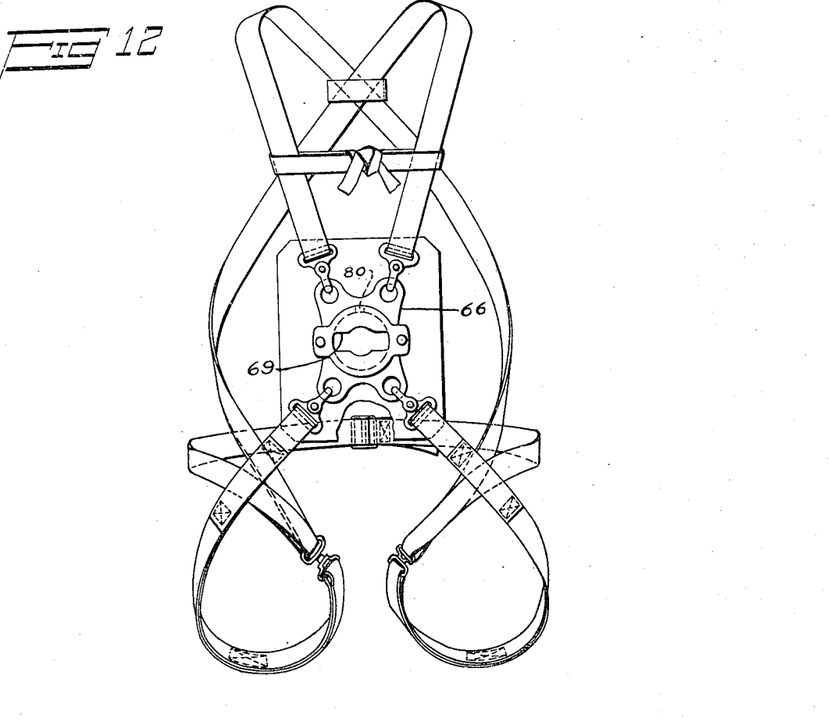
Fig. 12 is a front plan view of a modified form of parachute harness, illustrating a modified form of separable coupling device; in this instance the female coupling member being carried by the harness, the male coupling member being in turn carried by the body portion of the pack.
Figure 13:
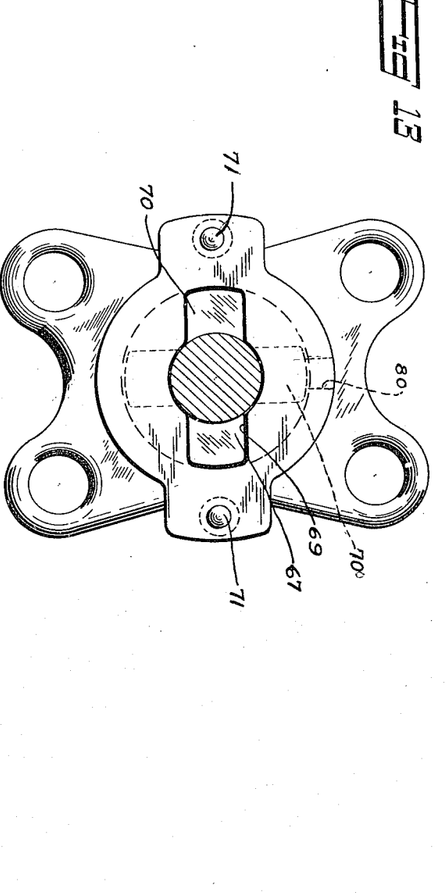
Fig. 13 is an enlarged view of the modified female coupling member shown in Fig. 12, the male coupling member being shown in locked and unlocked positions respectively for purposes of illustration.
Figure 14:
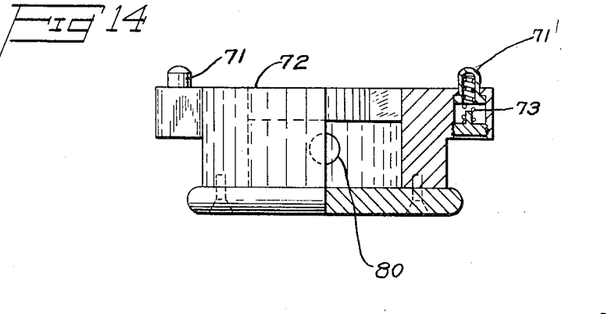
Fig. 14 is a side elevation of Fig. 13.
Figure 15:
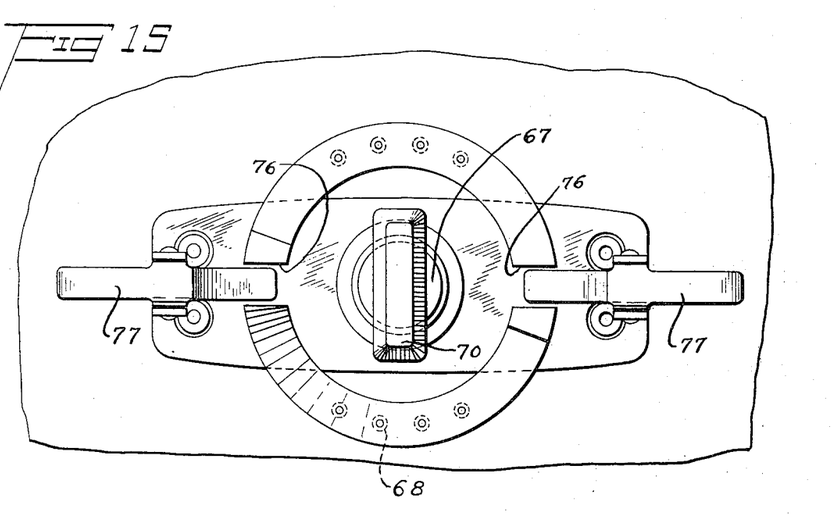
Fig. 15 is a top plan view of the male coupling member of my modified form of coupling device, including manually operated means for unlocking the said male coupling member from said female coupling member.
Figure 16:
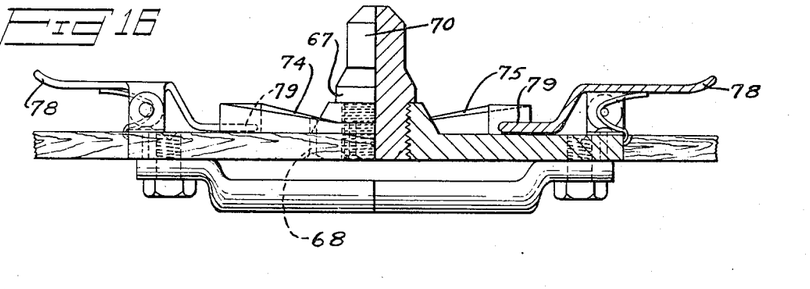
Fig. 16 is a side view, partly in section, of Fig. 15.
Figure 17:
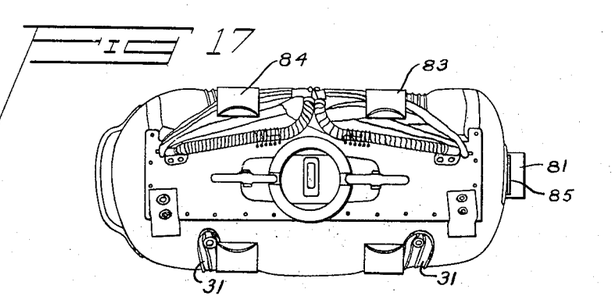
Fig. 17 illustrates a still further modified form of parachute pack, including a bracket for carrying the pack in the cockpit of an airplane.

Figs. 12 to 16 inclusive illustrate a modified form of separable coupling device wherein the female coupling member 66 is carried by the body harness, the male coupling member 67 being mounted on the base portion of the pack by means of machine screws 68 shown in Figs. 15 and 16. The female coupling members 66, as will be noted by referring to Figs. 12 and 13, are formed with a slotted opening 69 into which is adapted to be inserted the locking head 70 of the male coupling member 67. After insertion the pack is given a 90-degree axial twist in order to lock the male and female coupling members together, thus bringing the locking head 70 into the position illustrated in dotted line in Fig. 13. To retain the male and female coupling members locked relative to one another, the female member is provided with oppositely disposed and axially aligned locking plungers 71 normally projecting outwardly from the face 72 of said female member. Each plunger is backed by a spring 73, shown in detail in Fig. 4. When contact between the male and female coupling members is made the locking plungers ride on cam surfaces 74 and 75 provided on the male coupling member to gradually depress the plungers, placing the same under tension as the pack is rotated in attaching the pack to the harness. As the pack is rotated through 90 degrees of movement the locking plungers drop into grooves 76 provided in the male coupling member and so prevent turning of the pack, thus locking the pack to the harness. The locking plungers being placed under tension by the opposing forces exerted by the springs in being compressed as the pack is rotated are forcibly snapped into engagement with the groove 76, heretofore mentioned, and in so doing an audible click is produced sufficient to indicate the fact of the locked condition of the coupling device to the wearer.

To permit removal of the pack from the harness, spring controlled releasing latches 77 are provided on the male coupling member shown in detail in Figs. 15 and 16. These latches, normally under tension, are positioned under the locking plungers 71 when the pack is fastened to the harness. Should the aviator for any reason desire to detach the pack from the harness, it is only necessary to depress the free ends 78 of the locking latches, which same causes the inner ends to forcibly urge the locking plungers out of engagement with the groove 76, whereupon turning the pack axially permits removal of the male coupling member from the female coupling member.

In order to give assurance to the wearer of the coupling device being locked an aperture 80 is provided in the upper half of the female coupling member, as shown in Figs. 13 and 14, to permit the aviator to visually note the position of the locking head 70 heretofore mentioned.

Figure 18:
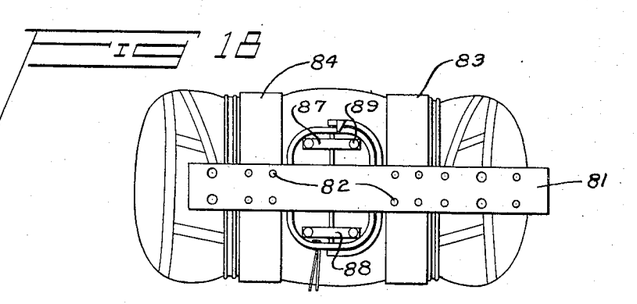
Fig. 18 is a rear view of Fig. 17, illustrating the position occupied by the rip cord handle when the pack is carried in the bracket.
Figures 19, 20:
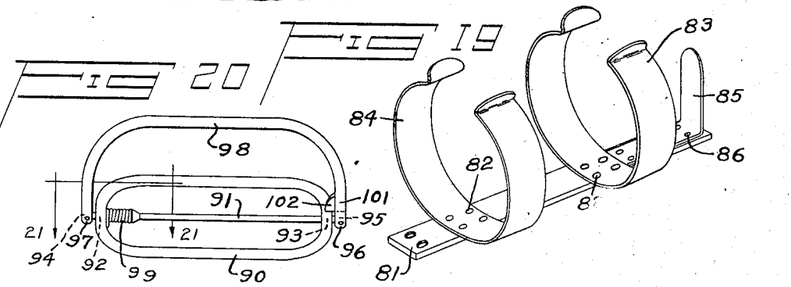
Fig. 19 is a view in perspective of the bracket per se.
Fig. 20 is an enlarged detail view of the rip cord handle.
Figures 21, 22:
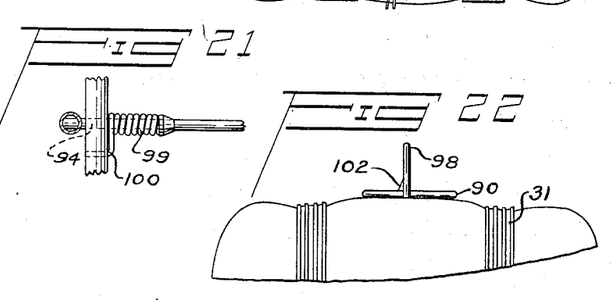
Fig. 21 is a section taken on the line 21—21 of Fig. 20.
Fig. 22 is a detail view illustrating the position assumed by the rip cord handle when the pack is removed from the bracket.

When the pack is being carried in the bracket, the rip cord handle is maintained flush with its supporting member 90, as illustarted in Fig. 18. When, however, the pack is removed from the bracket the rip cord handle being acted upon by the spring 98 will instantly move into the operative position illustrated in Fig. 22 and permit the hand grasping portion 98 of the rip cord handle to be readily grasped. This arrangement prevents accidental release of the rip cord while the pack is being carried in the bracket.

From the foregoing detailed description of my invention it will be apparent that I have provided improved means for quickly attaching a parachute pack to a body harness where it will be instantly available for use and so arranged as to permit the aviator to either manually attach the pack to the harness or to effect such attachment by pressing the body against the pack and relatively engage the male and female coupling members respectively.

From the foregoing description of the construction of my parachute apparatus, it will be apparent that I have provided simple and efficient means for carrying out the several objects of the invention and while I have particularly described the preferred embodiment best adapted to perform the functions set forth it is obvious that various changes in form and in the minor details of construction may be had without departing from the spirit of the invention.

Having thus described my invention, what I claim as new and desire to secure by Letters Patent is:

1. Separable coupling means for readily and quickly attaching a packed parachute to the body harness of an aviator comprising, a female coupling member for the harness and a male member for the pack, said female coupling member being formed with a socket portion having a slotted opening, said male coupling member comprising a locking lug having a T-shaped head adapted for insertion through said slotted opening and rotatable in said socket portion to interlock said members, one of said members being provided with camming surfaces having oppositely disposed recesses formed therein, the other member having resilient restraining means adapted to ride on said camming surfaces and engage in said recesses to lock said members against movement into releasing position.

2. Separable coupling means for readily and quickly attaching a packed parachute to the body harness of an aviator comprising, a female coupling member for the harness and a male coupling member for the pack, said female coupling member being formed with a socket portion having a slotted entrance opening, said male coupling member comprising a locking lug having a T-shaped head adapted for insertion through said slotted opening and rotatable in said socket portion to interlock said members, one of said members being provided with camming surfaces having oppositely disposed recesses formed therein, the other member having resilient restraining means adapted to ride on said camming surfaces and engage in said recesses to lock said members against movement into releasing position, and manually operable means engageable with said resilient restraining means for releasing the same and permit said male coupling member to be moved into releasing position.

3. Separable coupling means for readily and quickly attaching a packed parachute to the body harness of an aviator comprising, a female coupling member for the harness and a male coupling member for the pack, said female coupling member being formed with a circular socket portion having a slotted entrance opening, said male coupling member comprising a locking lug having a T-shaped head adapted for insertion through said slotted opening and rotatable in said socket portion to interlock said members, said male coupling member being provided with circular camming surfaces concentrically disposed with respect to the longitudinal center line of said locking lug and being formed with diametrically opposite recesses, said female member having a pair of diametrically opposite spring-controlled locking latches adapted to ride on said camming surfaces upon rotation of said male coupling member and engage in said recesses to lock said members against relative movement.

4. Separable coupling means for readily and quickly attaching a packed parachute to the body harness of an aviator comprising, a female coupling member for the harness, a male coupling member for the pack, said female coupling member being formed with a circular socket portion having a slotted entrance opening, said male coupling member comprising a locking lug having a T-shaped head adapted for insertion through said slotted opening and rotatable in said socket portion to interlock said members, said male coupling member being provided with circular camming surfaces concentrically disposed with respect to the longitudinal center line of said locking lug and being formed with diametrically opposite recesses, said female member having a pair of diametrically opposite spring-controlled locking latches adapted to ride on said camming surfaces upon rotation of said male coupling member and engaged in said recesses to lock said members against relative movement, and separate manually-controlled releasing means engageable with each of said locking latches individually for disengaging the latter from said recesses and permit said male coupling member to be moved into releasing position.

5. Separable coupling means for readily and quickly attaching a packed parachute to the body harness of an aviator comprising, a female coupling member for the harness and a male coupling member for the pack, said female coupling member being formed with a circular socket portion having a slotted entrance opening, said male coupling member comprising a locking lug having a T-shaped head adapted for insertion through said slotted opening and rotatable in said socket portion to interlock said members, said male coupling member being provided with circular camming surfaces concentrically arranged with respect to the longitudinal axis of said locking lug and being formed with diametrically opposite recesses disposed normal to the longitudinal axis of said T-shaped head, said female member having a pair of diametrically opposite spring-controlled locking latches disposed coincident with the longitudinal axis of said slotted opening engageable in the recesses of said camming surfaces upon relative rotational movement of said members.

6. In a coupling device as set forth in claim 5, said female member being characterized by including a sight aperture in communication with its socket portion to permit visual inspection of the coupled condition of said male and female members.

7. In parachute apparatus in combination, a body harness comprising diagonally extending chest straps converging toward a point of intersection substantially centrally of the wearer's chest, a normally detached parachute pack having a rigid base portion forming the back of said pack, coupling means for readily attaching the base of said pack to said harness comprising a pair of complemental members adapted for being lockingly interengaged with respect to one another, and means common to said harness and coupling means for respectively securing the converging end of said body straps together and in predetermined relation about the body of the wearer and for supporting one of the coupling means, the other of said complemental members being mounted on said base portion.

8. In parachute apparatus in combination, a body harness comprising diagonally extending chest and leg straps converging toward a point of intersection substantially centrally of the wearer's chest, a parachute pack normally detached from said body harness, detachable coupling means for readily attaching said pack to said harness comprising a pair of complemental members adapted for being lockingly interengaged with respect to one another, and means common to said harness and coupling means for respectively securing the converging ends of said straps together in predetermined relation about the body of the wearer and for mounting one of said complemental members.

9. In parachute apparatus in combination, a body harness comprising a pair of body supporting straps crossing at the back of the wearer and terminating adjacent the legs, said body straps passing over the shoulders and extending diagonally downwardly and inwardly toward a point of intersection disposed substantially centrally of the wearer's chest, a pair of leg straps connected at their one ends to the lower end of said body straps, said leg straps passing around the legs and extending diagonally upwardly and inwardly toward the point of intersection of said body straps, a parachute pack normally detached from said body harness, detachable coupling means for readily attaching said pack to said harness comprising a pair of complemental members adapted for being lockingly interengaged with respect to one another, and means common to said harness coupling means for respectively securing the free ends of said body and leg straps together in predetermined relation about the body of the wearer and for mounting one of said complemental members.

EDWARD L. HOFFMAN.